June 29, 1937. W. R. SCHUCHMAN ET AL 2,085,688
VALVE
Filed Nov. 30, 1935 2 Sheets-Sheet 2

INVENTORS.
Walter R. Schuchman
and Frank W. Ofeldt,
BY Edward A. Lawrence
their ATTORNEY.

Patented June 29, 1937

2,085,688

UNITED STATES PATENT OFFICE 2,085,688

VALVE

Walter R. Schuchman, Ben Avon, and Frank W. Ofeldt, McKeesport, Pa., assignors to Homestead Valve Manufacturing Company, Coraopolis, Pa., a corporation of Pennsylvania Application November 30, 1935, Serial No. 52,364

5 Claims. (Cl. 137—139)

Our invention relates to valves and the like wherein the valve is opened, closed, or in the case of a multiway valve shifted to different positions by rotary or other movement.

In such valves the contact pressure between the valve member and its seat must first be reduced before the other movement and such contact pressure must be restored at the completion of the other movement in closing.

This is especially true of rotary plug valves wherein the valve member or plug is usually tapered and its seat is correspondingly tapered, and thus the contact pressure between the plug and its seat must be in part reduced before it can be easily rotated.

In heavy service valves, such as those used in hydraulic installations, this preliminary reduction of contact pressure is very important as otherwise it would require the application of much greater force to rotate the valve member.

This requirement has been generally recognized in the valve art, but the means for accomplishing the purpose in view have required two separate movements of the valve member, one to unseat and the other to rotate.

In our invention we employ a fluid pressure for simultaneously reducing the contact pressure between the valve member and its seat and for rotating the valve member, and we provide a unitary means for the same. Thus the contact pressure between the valve member and its seat is reduced sufficiently to permit it to be readily rotated, but the valve member is not raised from its seat. Thus no washing or wearing of the seat is caused by the flow of the fluid over the seating surface.

This unitary means takes the form of a fluid pressure pilot valve which may be either hand operated or otherwise actuated, and which simultaneously admits fluid pressure for reducing the contact pressure and for rotating the valve member.

Other novel features of construction, and also of arrangement of parts will appear from the following description.

In the accompanying drawings, wherein we have illustrated a practical embodiment of the principles of our invention, Fig. 1 is a diagrammatic view of a plug valve to which our invention is applied, with parts shown in section, and showing the mechanism in neutral.

Figure 1:
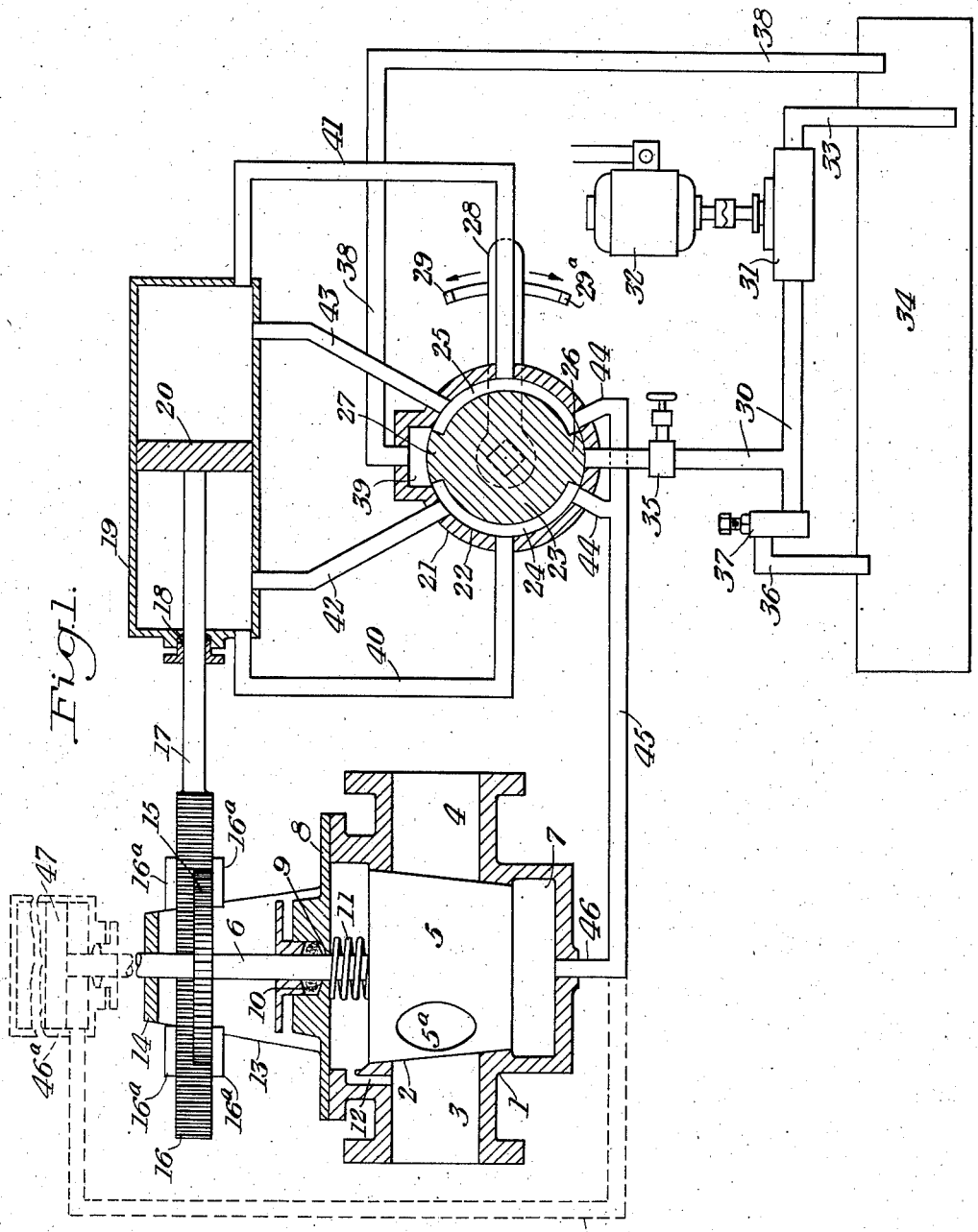

Referring to the drawings, 1 represents the casing of the valve which is provided with a tapered seat 2 and the opposed inlet and outlet flow passages 3 and 4, respectively. 5 represents the valve plug which is tapered to fit the seat 2 and is provided with a transverse port 5a and an axially disposed stem 6. The lower end of the valve seat 2 is closed and forms a chamber 7 which may be radially enlarged relative to the lower end of the seat 2.

The upper end of the valve casing is closed by a cap 8 provided with a hole 9 through which the stem 6 extends. A gland 10 is provided to prevent the escape of pressure or fluid along the stem.

We provide means for urging the plug downwardly in its seat. Thus we have shown the helical spring 11 surrounding the stem and bearing against the top of the plug 5 and the under side of the plate 8. Either as an auxiliary means for this purpose or as a substitute for the spring, we may provide a duct 12 leading from the inlet passage 3 to the space between the top of the plug and the plate, thus maintaining service-pressure at all times above the valve plug which acts to hold the plug seated and reestablish the proper seating force. Other means may be provided to create a seating pressure on the valve without departing from the scope of our invention.

The cap 8 forms the base of the bonnet structure of the valve which comprises two opposed vertical legs 13, one of which is shown in Fig. 1, and which preferably upwardly converge and are connected by a bridge 14 through a hole in which the stem 6 extends.

15 represents a gear wheel fixedly mounted on the stem and in mesh with a toothed rack 16 slidably mounted in the horizontal guides 16a which are part of the bonnet structure.

The rack 16 is carried by the outer end of the piston rod 17 extending through the gland 18 in the end of the cylinder 19, and attached to the piston 20 which works in said cylinder.

21 represents the casing of a pilot valve provided with a seat 22, which is preferably tapered, and in which is seated the plug 23. The plug is provided with two circumferentially disposed perimetral grooves 24 and 25 which are separated at their ends by the radially disposed projections 26 and 27 which contact and mate with the wall of the seat.

The plug is also provided with a radially disposed handle 28, and 29 and 29a represent the opposite limiting stops to determine the pilot valve position for opening and closing the main valve.

30 is a duct communicating with the seat 22 and leading from the discharge of a fluid pressure pump 31. The pump is shown to be of the rotary type and as driven by the motor 32.

33 represents an intake duct for the pump 31 communicating with the reservoir 34. 35 represents a metering valve in the duct 30 which is adjustable to control the quantity of fluid supplied to the pilot valve. The duct 30 is also provided with a by-pass 36 returning to the reservoir 34, which by-pass is provided with an adjustable automatic pressure relief valve 37.

38 represents a pressure relief duct leading from the casing 21 at a point diametrically opposite the duct 30 and communicating with the reservoir 34. The port 39 in the casing 21, with which the duct 38 is connected, is enlarged circumferentially of the casing so as to be somewhat wider than the projection 27 of the plug 23 so that when said projection is centered relative to said port, as shown in Fig. 1, pressure is relieved through the duct 38 from both of the grooves 24 and 25.

The casing is also provided at either side and half way between the ducts 30 and 38 with a pair of ports to which the ducts 40 and 41 are connected, respectively, which ducts are also connected to the opposite ends of the cylinder 19.

At points adjacent and spaced from its ends, the cylinder has connected thereto the pressure relief ducts 42 and 43 which are also connected to ports in the casing 21 at either side of and adjacent the relief port 39.

Ports are also provided in the casing 21 at either side of and adjacent the duct 30, with which ports are connected the branches 44 of the duct 45 which communicates at 46 with the chamber 7 beneath the plug 5 of the main valve.

The ports in the casing 21 of the pilot valve with which the several ducts above referred to are connected are in the same plane as that of the grooves 24 and 25 in the plug 23.

With the pilot valve in neutral, such as shown in Fig. 1, the plug 23 is in such position that the groove 24 registers with one of the branch ducts 44 and with the ducts 40 and 42, while the groove 25 registers with the other branch duct 44 and the ducts 41 and 43, and thus pressure is relieved from the chamber 7 beneath the plug 5 and from both ends of the cylinder 19 through the port 39 on either side of the projection 27 and through the relief duct 38 to the reservoir 34.

The relief of pressure beneath the plug 5 permits the downward force of the spring 11 or the service-pressure admitted to the duct 12 above the plug, or by both means, to exert the desired amount of seating force.

Figure 2:
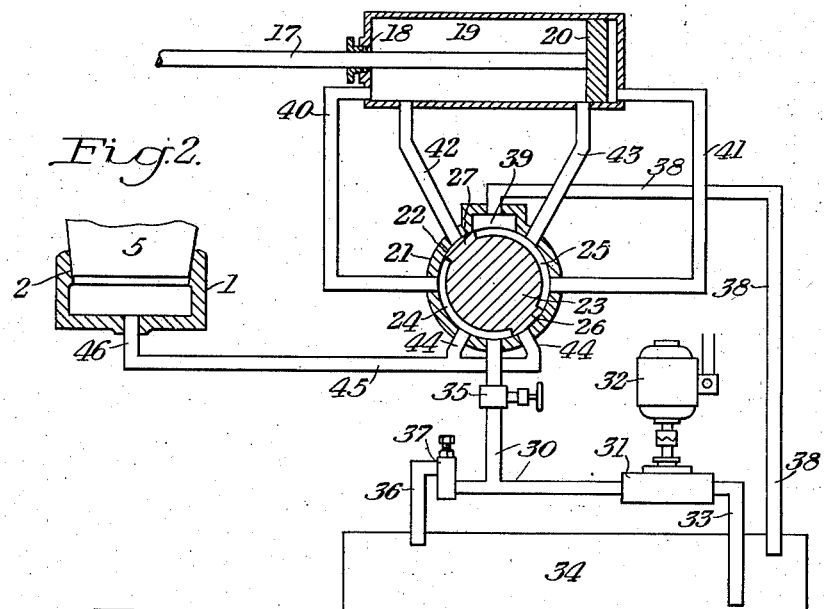
Fig. 2 is a like but incomplete view showing the parts after the reduction of contact pressure and the completion of the rotary movement of the valve member.

When the main valve is to be opened the handle 28 of the pilot valve is moved upwardly in Fig. 1 until it strikes the stop 29, thus moving the plug 23 into its position shown in Fig. 2, wherein the duct 42 is closed while the duct 40 and the duct 45 are connected to the pressure supply duct 30, thus admitting pressure into the left end of the cylinder 19 and beneath the seated plug 5. At the same time the duct 42 is closed while the ducts 41 and 43 are connected to the pressure relief duct 38 by the groove 25. The result is that the piston 20 is moved toward the right in the cylinder 19 and the rack 16 is moved in the same direction, thus rotating the plug 5 of the main valve from right to left in Fig. 2 and bringing the port 5a in said plug into registry with the flow passages 3 and 4 in the valve.

The admission of fluid pressure into the chamber 7 acts to reduce the seating pressure between the plug and its seat, while the pressure introduced into the left hand of the cylinder 19, as the friction between the plug and its seat is lessened, tends to move the piston as above described. Thus as shown, the seating pressure on the plug is reduced sufficiently to enable it to be rotated. Such rotation is accomplished without unseating the plug which would result in the passage of fluid between the seating members of the valve washing or wearing the seat.

When the piston 20 travels sufficiently to uncover the duct 43 the pressure is relieved and further movement is prevented.

By thus relieving the pressure at the end of the stroke, a building up of pressure, which would result were the piston allowed to come against a mechanical stop such as the cylinder end, is prevented, and the lifting of the plug 5 from its seat is also prevented.

The position of the piston in the cylinder 19 and that of the plug 23 of the pilot valve at the completion of the valve opening operation is illustrated in Fig. 2.

Figure 3:
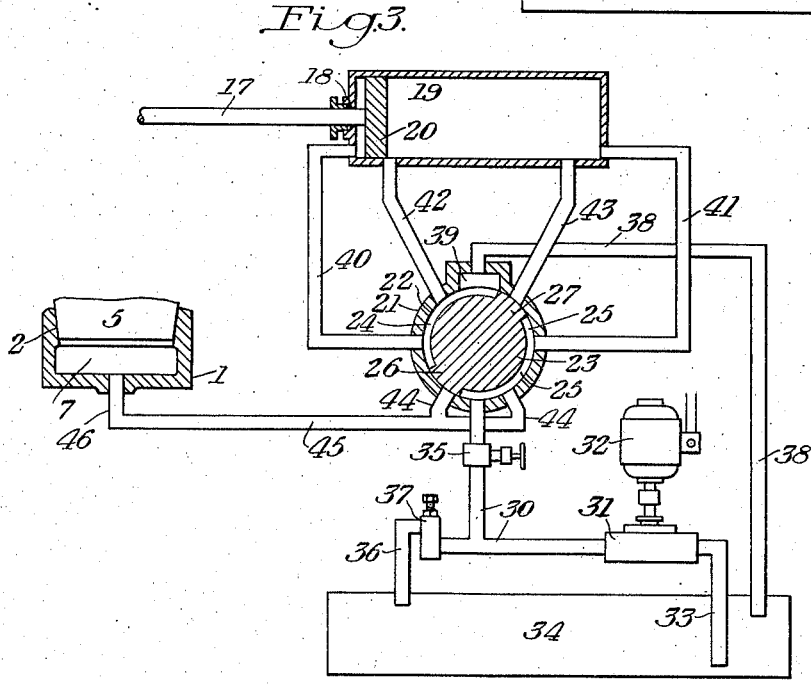
Fig. 3 is a similar view showing the parts at the completion of the rotating movement, in the return direction.

Now, to close the valve the handle 28 is moved downwardly in Fig. 1 until it engages the stop 29a whereupon the plug 23 of the pilot valve will assume its position shown in Fig. 3. Thus the ducts 40 and 42 have now been brought in communication with the port 39 and the relief duct 38, the duct 43 has been closed while the duct 41 and the duct 45 are in communication with the pressure supply duct 30.

Thus the plug 5 is subjected to a pressure sufficient to partly reduce the seating pressure, while the piston 20 is moved from its position shown in Fig. 2 into its position shown in Fig. 3, thus moving the rack 16 from right to left in Fig. 1 and rotating the plug 5 of the main valve from left to right and returning the plug to its closed position.

The handle 28 is now returned to its neutral position, as shown in Fig. 3, wherein the plug 23 of the pilot valve assumes its position shown in Fig. 1, when as above explained, all of the ducts 40, 41, 42, 43 and 45 are connected to the exhaust duct 38. As above explained, the pressure has been relieved from the chamber 7 and the plug 5 has its full seating force reestablished by the spring 11, or by service-pressure admitted to the duct 12, or by both of said means.

As a modification I have indicated in Fig. 1 the duct 45 extended, as shown in dotted lines, and a cylinder 46a supported above the main valve and having its piston 47 attached to the stem 6 of the plug 5. The arrangement is such that pressure is admitted below the piston 47 when the duct 45 is connected to the fluid pressure supply, thus partly reducing the seating pressure on the valve. In such case the chamber 7 need not be used.

The metering valve 35 functions to control the quantity of fluid supplied to the pilot valve, and thus to regulate the speed of operation.

The function of the metering valve 35 is of great importance. By means of such valve we regulate the quantity of fluid admitted to the pilot valve to actuate the means for rotating the plug or valve member of the main valve. The operation is as follows. As soon as the pressure in the chamber 7 relieves the friction of the valve plug in its seat sufficiently to allow the piston 20 to rotate the plug, then the piston moves and the pressure in the chamber is prevented from further releasing the seating force on the plug. Thus the plug is never lifted from its seat but the seating force is reduced sufficiently to permit the rotary force to turn the plug.

For the sake of illustration, and as a preferred form of our invention, we have shown the use of a reservoir for a liquid operating medium, such as water or oil, and a pressure pump for the same, but it will be understood that air, steam or any other fluid medium under suitable pressure may be employed. Again, if the service-pressure of fluid in the pipe or passage in which the main valve is interposed is sufficiently high and sufficiently constant, such pressure may be used as the actuating medium, under the control of the pilot valve, for reducing the seating force on the valve plug and for rotating the latter.

We claim:—

1. In a valve structure the combination of a valve member constantly maintained in pressure contact with its seat, fluid pressure means for partially reducing the contact pressure between the valve member and its seat, to permit the movement of the valve member, fluid pressure means for moving the member, unitary control means for both of said above mentioned means, and means for urging the member into initial contact pressure with its seat when said control means is inoperative.

2. In a valve structure the combination of a valve member constantly maintained in pressure contact with its seat, fluid pressure means for partially reducing the contact pressure between the valve member and its seat, to permit the movement of the valve member, fluid pressure means for moving the member, and a pilot valve arranged to simultaneously admit pressure to and relieve pressure from both of said above mentioned means.

3. In a valve structure the combination of a valve member constantly maintained in pressure contact with its seat, fluid pressure means for partially reducing the contact pressure between the valve member and its seat, to permit the movement of the valve member, fluid pressure means for moving the member, a pilot valve arranged to simultaneously admit pressure to and relieve pressure from both of said above mentioned means, and means for urging the member into initial contact pressure with its seat.

4. In a valve structure the combination of a valve member maintained in pressure contact with its seat, fluid actuated means for partially reducing the seating pressure of said valve, fluid actuated means for moving said valve, both of said means being actuated by a common fluid, means for controlling the quantity of fluid delivered to said means to determine the time of operating said valve member, and means for discharging the fluid at the end of the movement of said valve member.

5. In a valve structure the combination of a constantly pressure seated valve member, fluid actuated means to partially reduce the seating pressure on the valve member, and a second fluid actuated means to move the valve member, both of said means being actuated by a common fluid, said second fluid actuated means being arranged so that its movement prevents the first named fluid actuated means from further reducing the seating pressure.

WALTER R. SCHUCHMAN.
FRANK W. OFELDT.